United States Patent [19]
Schoen

[11] 3,757,476
[45] Sept. 11, 1973

[54] EXPANDABLE SPACE-FRAMES
[75] Inventor: Alan H. Schoen, Valencia, Calif.
[73] Assignee: National Aeronautics and Space Administration, Washington, D.C.
[22] Filed: Dec. 17, 1970
[21] Appl. No.: 99,198

[52] U.S. Cl............................ 52/646, 52/64, 52/80, 52/109, 287/92
[51] Int. Cl............................................ E04h 12/18
[58] Field of Search .................. 52/64, 80, 81, 109, 52/108, 645, 646; 287/92 X

[56] References Cited
UNITED STATES PATENTS

| | | | |
|---|---|---|---|
| 2,868,568 | 1/1959 | Frye | 287/92 X |
| 3,185,164 | 5/1965 | Pinero | 52/646 X |
| 3,375,624 | 4/1968 | Mikulin | 52/109 |
| 561,703 | 6/1896 | Engert | 52/645 |
| 3,053,351 | 9/1962 | Fulcher | 52/109 |
| 3,333,375 | 8/1967 | Johnston | 52/81 |

OTHER PUBLICATIONS
Canadian Journal of Mathematics, Vol, 7, No. 1, 1955, H.S.M. Coxeter, pages 18–23.

Primary Examiner—Alfred C. Perham
Attorney—Monte F. Mott and Paul F. McCaul

[57] ABSTRACT

Expandable space-frames having essentially infinite periodicity limited only by practical considerations, are described. Each expandable space-frame comprises a plurality of hinge joint assemblies having arms that extend outwardly in predetermined symmetrically related directions from a central or vertex point. The outer ends of the arms form one part of a hinge joint. Each expandable space-frame also comprises a plurality of struts. The outer ends of the struts form the other part of the hinged joint. The struts interconnect the plurality of hinge joint assemblies so that an essentially infinite periodic space-frame is formed. By rotating all of the hinge joints in synchronism, the thusly formed space-frames can be expanded or collapsed. Three-dimensional as well as two-dimensional space-frames of this general nature are described.

1 Claim, 13 Drawing Figures

INVENTOR
ALAN H. SCHOEN

PATENTED SEP 11 1973 3,757,476

INVENTOR
ALAN H. SCHOEN

BY Earl Levy
ATTORNEYS

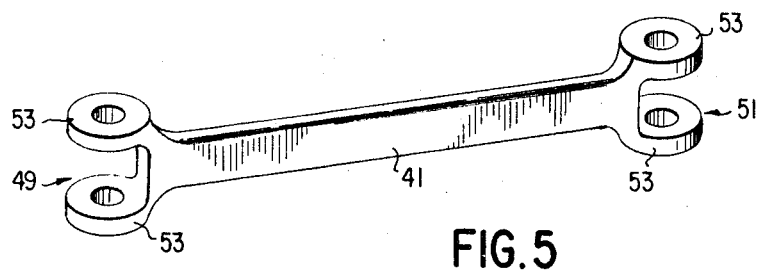
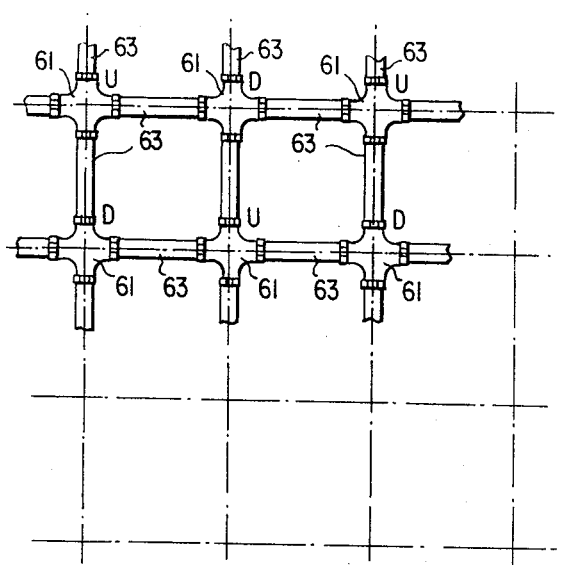
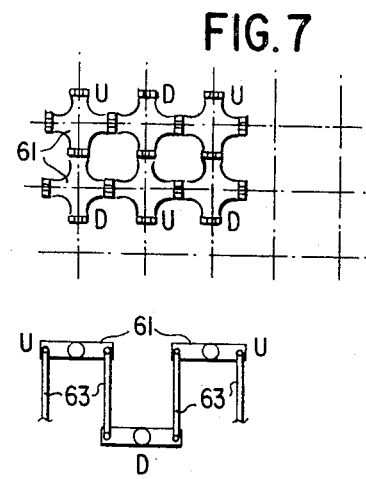
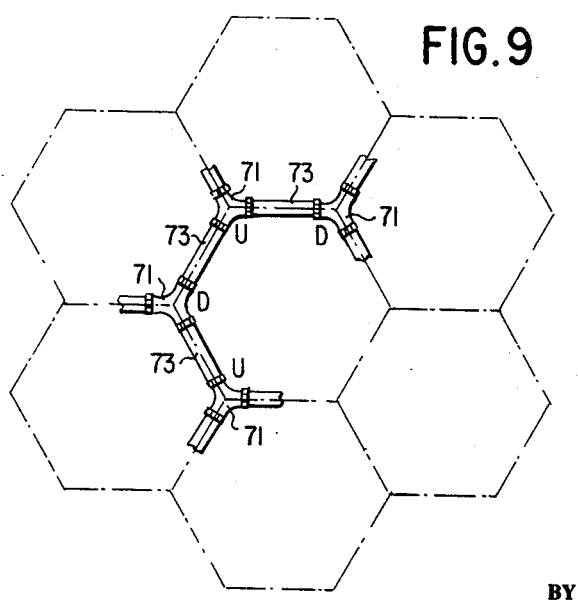
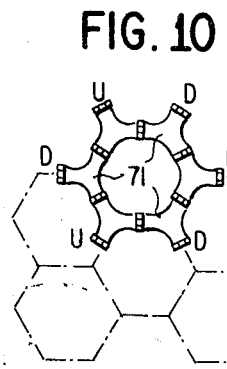
INVENTOR
ALAN H. SCHOEN

EXPANDABLE SPACE-FRAMES

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This disclosure relates to space-frames and more particularly, to expandable space-frames that have a relatively large expansion-to-collapse ratio.

In general, a space-frame is a plurality of struts that meet at various junctions in various manners to form an overall structure. They are usually riveted, bolted, welded, or brazed together at the junction points, as determined by their ultimate use.

Various types of space-frames have been proposed and are in use. They have been often utilized in the building of various structures to define the outer perimeter of the structure. For example, they have been utilized to define domes which, when enclosed, form a building. In addition, they have been utilized to form towers and other structural members. They have also been utilized as trusses in floors and walls.

One of the problems with prior art space-frames is that they often must be individually constructed at the site of use. That is, because of the large ultimate size of a space-frame, individual struts or component parts are usually brought to the space-frame construction site and attached at junctions in an appropriate manner to form the resultant space-frame. A commonly viewed example of this procedure is the construction of scaffolding at a building site. If the space-frame is only designed for temporary use, it must also be disassembled after such use. It will be appreciated that this procedure is time consuming and, therefore, costly.

Various proposals have been made to form expandable space-frames which can be collapsed during transportation and expanded at the site of use. However, the collapse ratio of these structures is generally quite limited. Moreover, the resultant end structure generally has a predetermined shape, such as a tower or truss. Furthermore, other such structures employ more than one single kind of strut and more than one single kind of joint or connector, thereby embodying considerable complexity of design. Hence, these structures have not been entirely satisfactory for widespread use. Other proposals have been made for the creation of expandable space-frames for use in connection with space vehicles, such as to define the structure of a manned orbiting satellite. However, in general, these space-frames have not been sufficiently rigid for use in other environments. Moreover, their expansion ratios have not been entirely satisfactory. Also, these space-frames usually do not afford the possibility of being constructed from an arbitrarily large or small number of elements, because they do not possess true lattice periodicity.

In addition to the foregoing problems, collapsible space-frames that have been proposed generally have relatively complex joints where the various struts are connected together. This complexity tends to weaken the overall structure as well as make it expensive to manufacture and use.

Therefore, it is an object of this invention to provide a new and improved space-frame.

It is a further object of this invention to provide an expandable space-frame.

It is another object of this invention to provide an expandable space-frame that has a relatively high ratio of expansion to collapse.

It is still another object of this invention to provide an essentially infinite periodic expandable space-frame that has a high expansion-to-collapse ratio.

SUMMARY OF THE INVENTION

In accordance with principles of this invention, expandable space-frames are provided. Expandable space-frames formed in accordance with the invention generally comprise a plurality of hinge joint assemblies. Each hinge joint assembly includes a plurality of arms that extend outwardly in symmetrically related predetermined directions from a central vertex. The outer ends of said arms form one part of a hinged joint. The space-frames also comprise a plurality of struts that interconnect the hinge joint assemblies. The outer ends of the struts comprise the other part of a hinged joint. Hence, a hinged joint exists where each strut meets an arm of a hinge joint assembly. Expansion (or collapse) of the space-frames is provided by simultaneously rotating all of the hinged joints with respect to the center of the hinge joint assemblies. In essence, expandable space-frames thusly formed have true lattice periodicity and are essentially infinite in nature. That is, thusly formed space-frames are only limited in overall size by practical considerations, not by outer boundary structural considerations or by the inherently fixed dimensions imposed by lack of symmetry.

In accordance with further principles of this invention, the expandable space-frames of the invention are two-dimensional in nature. In one form, they are based on a square two-dimensional lattice. In an alternate form they are based on a regular hexagonal two-dimensional lattice.

In accordance with alternate principles of this invention, the expandable space-frames of the invention are three-dimensional in nature. In a preferred form of this structure, the hinge joint assemblies are defined as extending outwardly from the center of an imaginary cube in three symmetrically equivalent directions. As with the two-dimensional embodiments, the collapse or expansion of this structure is performed by symmetrically rotating the hinged joints about the center of the hinge joint assemblies so that the rotation of each joint is performed at the same time and at the same rate.

It will be appreciated from the foregoing summary of the invention that an uncomplicated space-frame is provided. The three-dimensional embodiment has a practical volume collapse ratio of up to 80:1 depending upon the number, size, and proportions of the various elements. More specifically, as the size of the struts is increased in diameter and/or decreased in length, interference occurs between struts at an earlier point during collapse whereby the volume collapse ratio is decreased. In addition, the distance between the hinged joints and the center of the hinge joint assembly has an effect on the volume collapse ratio. However, a realistic volume collapse ratio of 80:1 can be achieved. The area collapse ratios of the two-dimensional embodiments are also relatively high. In fact, a practical area collapse ratio as high as 400:1 can be achieved for the square two-dimensional lattice embodiment. A practical maximum area collapse ratio for the hexagonal lattice embodiment is somewhat less than this figure but is also quite high. Again, these are only examples of practical area collapse ratios. The actual area collapse ratio will depend upon the distance of the hinged joints from the center of the hinge joint assemblies and the length, size, and proportions of the struts.

It will be appreciated by those skilled in the art and others that not only does a space-frame assembly formed in accordance with the invention have a considerably greater expansion to collapse ratio than prior art assemblies but that it is also relatively uncomplicated in nature, merely using identical simple hinged joints to form the interconnections between the various components. In addition, because the array of struts and hinge joint assemblies is periodic in nature, the inventive space-frames can be built to any practical, realizable size, as desired.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings, wherein:

FIG. 5 illustrates a strut formed in accordance with the invention and suitable for use in various embodiments thereof;

FIG. 6 is a fully extended plan view of a portion of a two-dimensional space-frame formed in accordance with the invention that has a square lattice periodicity;

FIG. 7 is a fully collapsed plan view of a portion of the two-dimensional space-frame illustrated in FIG. 6;

FIG. 8 is a side view of a portion of the space-frame illustrated in FIG. 7;

FIG. 9 is a fully extended plan view of an alternate embodiment of two-dimensional space-frame formed in accordance with the invention and has hexagonal periodicity; and FIG. 10 is a plan view of a collapsed space frame of the type illustrated in FIG. 8.

DESCRIPTION OF THE PREFERRED EMBODIMENTS

The following description describes three space-frames formed in accordance with the invention. The first space-frame described is a three-dimensional space-frame based on the Laves graph, fully described in an article authored by H.S.M. Coxeter, entitled "On Laves Graph of Girth 10," and appearing in Canadian Journal of Mathematics, 1955, Volume 7, Pages 18 through 23. The other space-frames described are, in essence, two-dimensional space-frames. That is, the latest two space-frames described essentially define a plane when they are expanded, whereas the first space-frame described defines a volume when expanded. However, all of the space-frames are formed of the same basic components — a plurality of hinge joint assemblies having arms that extend outwardly from a common center point, and a plurality of struts that interconnect the hinge joint assemblies. All of the space-frames are expanded or collapsed by simultaneously and symmetrically rotating all of the hinge joints with respect to the common center point of their respective hinge joint assemblies.

Turning now to the drawings, FIGS. 1A–D illustrate the theoretical operation of the three-dimensional space-frame herein described. As previously stated, this space-frame is based on the Laves graph. While several other three-dimensional space-frames can be formed in accordance with the invention, it has been found that this space-frame has the greatest volume collapse ratio for practical, realizable strut and hinge joint assemblies. That is, because mechanical interferences occur between the struts as the assembly is rotated from an expanded form to a collapsed form, a volume collapse ratio results that is less than the theoretical maximum volume collapse ratio which would result if such interferences could be ignored. It has been determined mathematically that a volume collapse ratio of approximately 80:1 can be achieved for the three-dimensional embodiment hereafter described when practical components are used. In addition to the mechanical interference of struts, "pair-wise vertex fusions" occur in some, but not all, of the more complex structures of this type, which also limit the collapse ratio.

Figure 1A:
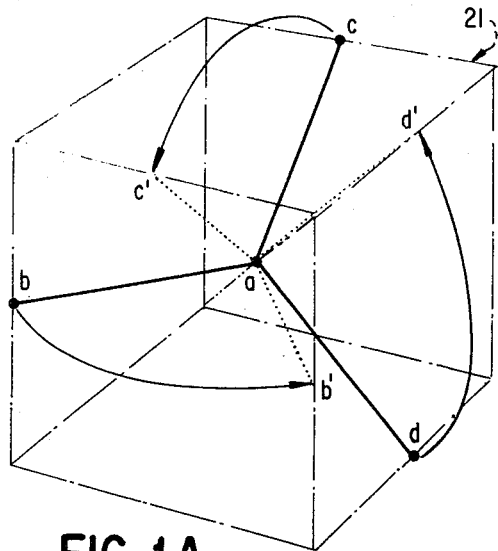
FIGS. 1A–D illustrate imaginary cubes wherein a section of a three-dimensional expandable space-frame is illustrated in schematic form and are used to explain the nature of the collapse of this space-frame embodiment.

FIG. 1A illustrates a vertex point designated a located at the geometric center of an imaginary cube 21. Consequently, the vertex a inherently is coincident with a point of intersection for imaginary diagonals extended between the midpoint of a pair of diametrically opposed corner edges of the imaginary cube. As is illustrated in FIG. 1A, the imaginary cube has front and rear faces, right and left side faces, and top and bottom faces. Extending along three imaginary, symmetrically related diagonals outwardly from vertex point a are three struts designated $ab$, $ac$, and $ad$. Strut ab extends from vertex point $a$ to a point designated $b$ located in the middle of the edge between the left face and the front face of the imaginary cube 21. Strut ad extends from vertex point a to a point designated d located in the middle of the edge between the right side face and the bottom face of the imaginary cube 21. In other words, the struts $ab$, $ac$, and $ad$ extend outwardly in equal directions for equal lengths from the vertex point $a$. This strut location is for the fully expanded position of the herein described space-frame.

FIG. 1A also illustrates three dotted lines extending outwardly from vertex point $a$. The dotted lines represent the locations of the struts $ab$, $ac$, and ad when the space-frame is fully collapsed and interferences are ignored and are defined as $ab'$, $ac'$, and $ad'$. Line ab' extends from vertex point a to a point designated $b'$ located in the middle of the edge formed between the front face and the right side face of the imaginary cube 21. Line $ac'$ extends from vertex point $a$ to a point designated $c'$ located in the middle of the edge between the front face and the top face of the imaginary cube 21. Line ad' extends from vertex point a to a point designated d' located in the middle of the edge between the top face and the right face of the cube 21.

The space-frame is collapsed by simultaneously and symmetrically rotating the three struts from their original positions ab, ac, and ad, to their dotted positions ab', ac', and ad', respectively, along the illustrated arcs from b to b', c to c', and d to d'. As can be seen from FIG. 1A, when this collapsing action is completed, the original volume defined by the struts is decreased. While, as a practical matter, this entire rotation cannot be achieved, because pair-wise strut collisions occur, a great percentage of it can be achieved. More specifically, the arcs through which the struts are rotated are theoretically 90°. However, mechanical interferences due to strut collisions occur at approximately 76° for a practically sized embodiment of the invention, i.e., an embodiment formed of reasonably sized struts and vertex points that are slightly displaced outward from the rotation or hinge points. Percentage wise 76° is near 90°, whereby a great portion of the theoretical maximum volume collapse can be achieved in a practical embodiment of the invention.

Figure 1B:
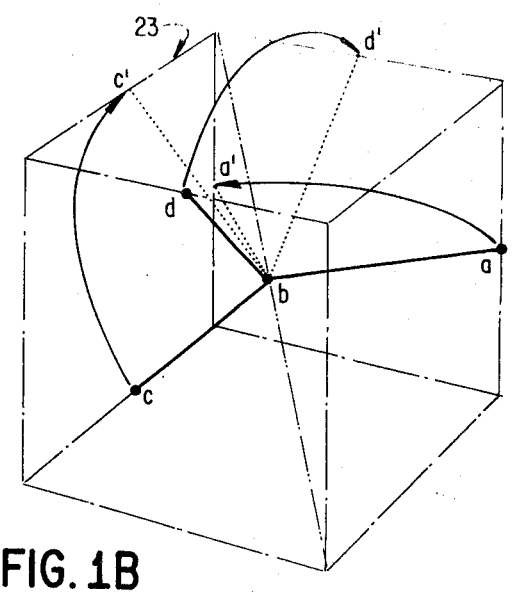
Figure 1C:
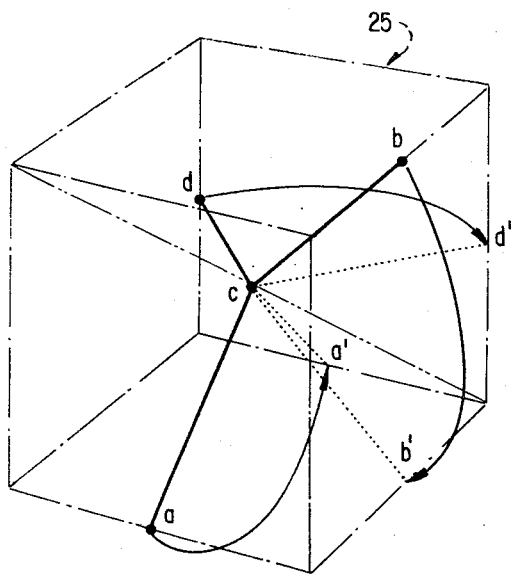
Figure 1D:
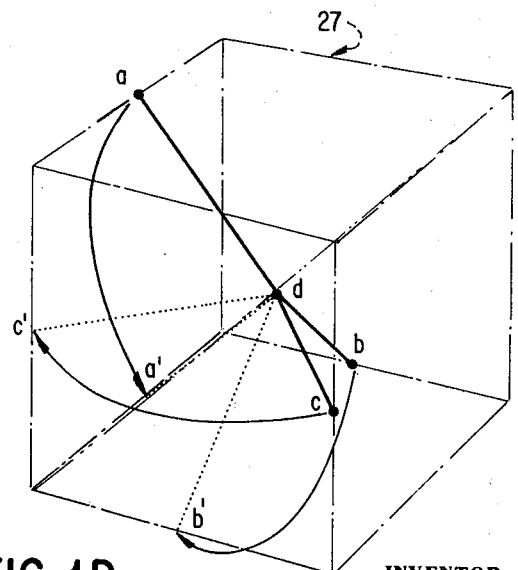

FIGS. 1B, 1C, and 1D illustrate that the ends of the struts ab, ac, and ad which are points b, c, and d can form the vertices of other configurations similar to FIG. 1A whereby an overall collapsible space-frame that is essentially infinite is formed. More specifically, FIG. 1B illustrates a configuration wherein the vertex is at point b. From this point four struts, ba, bc, and bd extend outwardly in equal directions. Strut ba extends from vertex b to a point a located in the middle of the edge between the rear face and the right side face of an imaginary cube 23. Strut bc extends from vertex b to a point c located in the middle of the edge between the left side face and the bottom face of the imaginary cube 23 and strut bd extends from vertex b to a point d located in the middle of the edge between the top and front face of the imaginary cube 23. Also illustrated in FIG. 1B are the collapsed strut positions ba', bc', and bd'. Line ba' extends from vertex b to a point a' located in the middle of the edge between the left side face and the rear face of the imaginary cube 23. Line bc' extends from vertex b to point c' located in the middle of the edge between the left side face and the top face of the imaginary cube 23. And line bd' extends from vertex b to a point d' located in the middle of the edge between the top and rear faces of the imaginary cube 23. In a similar manner, FIG. 1C illustrates the expanded (solid) and collapsed (dotted) position for a vertex c located inside of an imaginary cube 25 and FIG. D illustrates the same information for a vertex b located inside of an imaginary cube 27.

It will be appreciated that the enclosing imaginary cubes illustrated in FIGS. 1A–D are shown only for the purpose of illustrating how the three struts incident at a particular vertex are oriented in the expanded and collapsed positions. The cubes do not form a part of the Laves graph.

It will be appreciated from viewing FIGS. 1A–D that there are only six distinctly oriented struts in the overall Laves graph, ab, ac, ad, bc, bd, and cd. It will also be appreciated that the curved arcs illustrated in FIGS. 1A–D indicate the quarter-circle (90°) trajectory described by each vertex with respect to any of the three vertices to which it is attached by a strut during the transformation between the fully expanded and fully collapsed positions.

A dashed line is also illustrated in each of FIGS. 1A–D. The dashed lines represent the axis of symmetry passing through the vertex in the center of each cube. For example, in FIG. 1A the dashed line extends from the intersection of the top, front, and right side faces to the intersection between the bottom, rear, and the left side faces. In FIG. 1B the dashed line extends from the intersections between the rear, top and left side faces to the intersection between the bottom, front and right side faces.

It will be understood by those skilled in the art that there are four distinct orientations of the vertices which occur in a Laves graph. They are labeled in FIGS. 1A–D as a, b, c, and d. Each of these vertices is joined by a strut to one each of the other three vertices. Thus, FIGS. 1A–D provide sufficient information for the construction of an entire infinite periodic Laves graph, or a space-frame based on a Laves graph. The array of three struts incident at a single vertex located in the center of an imaginary cube can be imagined as translated parallel to itself (i.e., without rotation) into a position which penetrates into the volume of any other of the three cubes as a representation of the connections along struts in the infinite graph. For example, the strut ac in the cube containing vertex a at its center (FIG. 1A) can be imagined as superimposed on the strut ac in the cube containing the vertex c at its center (FIG. 1C). Such a superposition illustrates the arrangement of the five struts ac, ba, ad, dc, and bc (i.e., all of the struts appearing in either of the two aforementioned cubes).

As previously stated, the curved arcs illustrated in FIGS. 1A–D indicate the circular trajectories, with respect to the central vertex of the given imaginary cube of the neighboring vertices of the struts. In the idealized case illustrated in FIGS. 1A–D, wherein mechanical interferences are ignored between pairs of struts, these trajectories comprise a 90° central angle arc of a circle. However, as previously stated, the mechanical interferences that occur in an actual embodiment of the invention will limit this circular rotation to about 76°.

Figure 2:
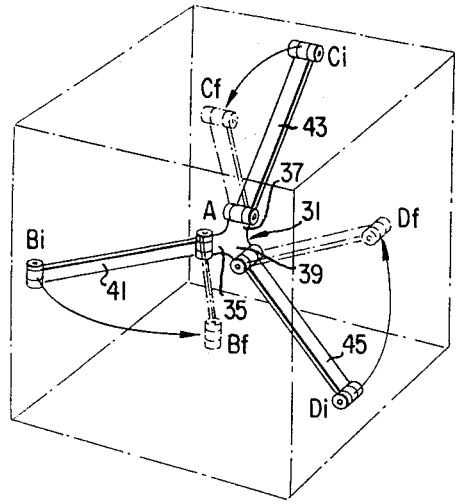
FIG. 2 is an illustration of a section of a three-dimensional space-frame including a single hinge joint assembly and a plurality of struts.

FIGS. 2-5 illustrate an apparatus for carrying out the theoretical concept illustrated in FIGS. 1A–D and described above. FIG. 2 illustrates a hinge joint assembly 31 having a center or vertex illustrated at the center of an imaginary cube 33. The hinge joint assembly 31 has three arms 35, 37, and 39 that extend outwardly from the vertex a. The arms 35, 37, and 39 extend in the directions ab, ac, and ad, respectively, illustrated in FIG. 1A and previously described. Also illustrated in FIG. 2 are three struts 41, 43, and 45.

Formed in or attached to the end of each arm, 35, 37, and 39 is one part of a hinge. Moreover, formed in or attached to each end of a strut is the other part of the hinge. An enlarged view of a hinge joint assembly 31 connected to the three struts 41, 43, and 45 is illustrated in FIG. 4.

Figure 4:
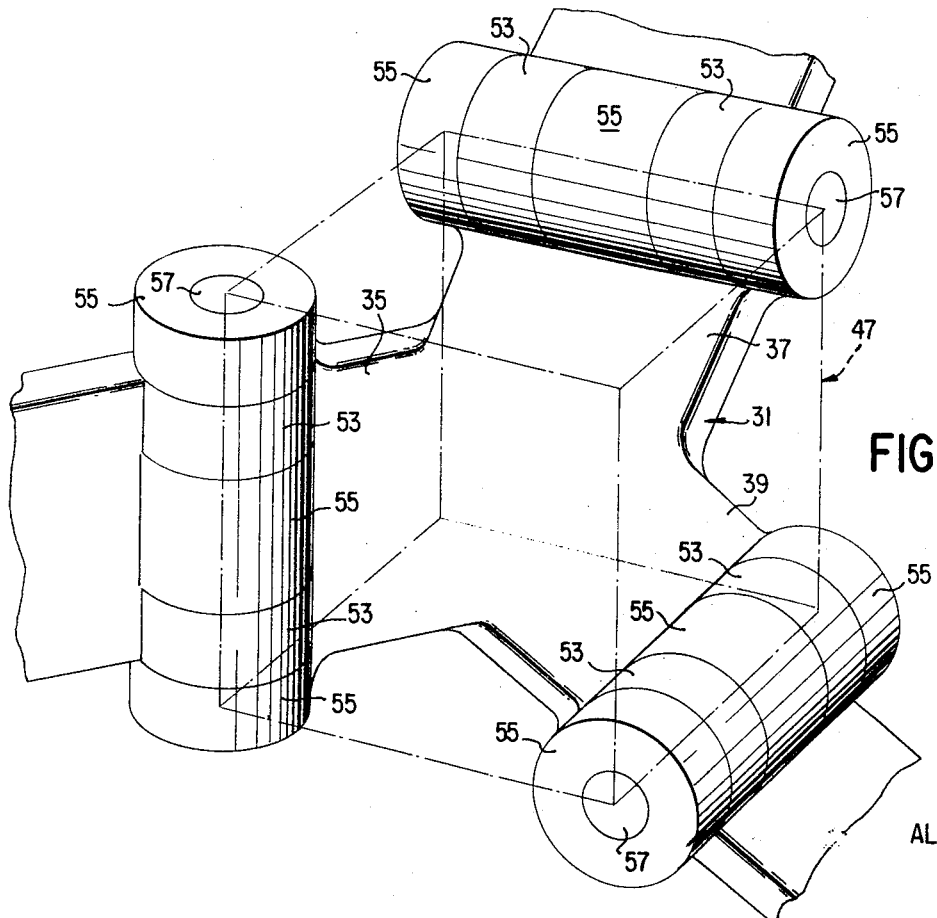
FIG. 4 is an enlarged prespective view of a single hinge joint assembly of a three-dimensional space-frame formed in accordance with the invention.

It can be seen from FIG. 4 that the axes of the hinge joints also define an imaginary cube 47, the center of which is coincident with a vertex of an imaginary cube previously described. The imaginary cube 47 is smaller but is geometrically aligned with the imaginary cube 33 (FIG. 2). More specifically, the hinge joint at the end of arm 35 defines the edge of the front and left side faces of the imaginary cube 47 which parallel the front and left side faces of the imaginary cube 33. The axis of the hinge joint on the end of arm 37 defines the edge of the top and rear faces of the imaginary cube 47 which parallel the top and rear faces of imaginary cube 33. And the axis of the hinge joint on the end of arm 39 defines the edge of the bottom and right side faces of the imaginary cube 47 which parallel the bottom and right side bases of the imaginary cube 33.

FIG. 5 illustrates a strut 41 formed in accordance with the invention having a part of a hinge 49 and 51 located on either end thereof. The hinge parts 49 and 51 coact with the hinge parts on the ends of the arms of the hinge joint assemblies as illustrated in FIG. 4 to form hinge joints that allow strut rotation over the desired arc.

For purposes of illustration, the hinges illustrated in the drawings are flanged hinges that have pins located along the indicated axes. More specifically, the end of each strut 41 has two flanges 53 which are washer shaped and define an axis that is at right angles to the longitudinal axis of the strut. In addition, each arm of each hinge joint assembly 31 has three flanges 55 that are washer shaped and define an axis along the previously indicated edges of imaginary cube 47. The two flanges of each strut fit in the openings between the three flanges of the arms of the hinge joint assemblies. Hinge pins 57 pass through the apertures in the thusly assembled flanges. It should be noted that this assembly can be modified in many different and well-known ways as long as the desired hinge action is achieved. If desired, the hinges may be provided with spring-loded or other mechanisms which will lock them in the desired positions after rotation. Moreover, various spring-loaded and other types of mechanisms may be utilized to automatically deploy the space-frame from the collapsed state to the expanded state, if desired.

Returning now to FIG. 2 wherein there is also illustrated the initial and final positions of the struts joined to the hinge joint assembly 31 in the manner previously illustrated and described. More specifically, points $B_t$, $C_t$, and $D_t$, illustrated in FIG. 2 are in the same location as points $b$, $c$, and $d$ of FIG. 1A. Hence, these points represent the center of their respective vertices when the space-frame is fully deployed. Also illustrated in FIG. 2 are points designated $B_f$, $C_f$, and $D_f$. These latter points are the center of their respective vertices, $b$, $c$, and $d$ when the space-frame is fully collapsed. It can be seen that $B_f$ lies along the arc between $b$ and $b'$ of FIG. 1A. Similarly, $C_f$ lies along the arc between $c$ and $c'$ of FIG. 1A and $D_f$ lies along the arc between $d$ and $d'$ of FIG. 1A. The angle subtended between the $C_t$ and $C_f$ positions, $B_t$ and $B_f$ positions and $D_t$ and $D_f$ positions is limited by the mechanical interference that occurs between the struts when the space-frame is collapsed. As previously indicated, this arc can be as high as 76° for a practical embodiment of the invention.

Figure 3:
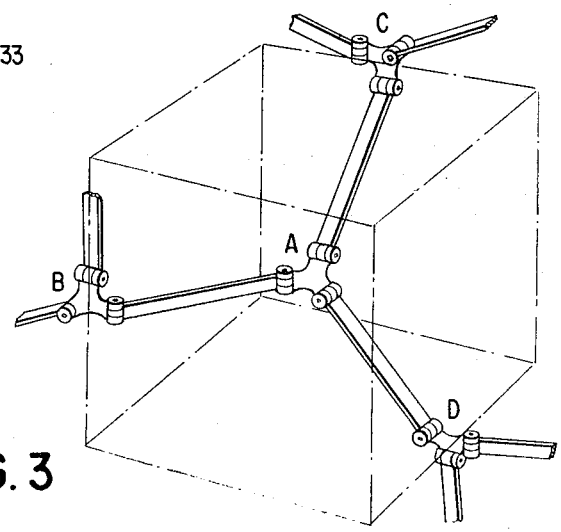
FIG. 3 is an illustration of a portion of a three-dimensional space-frame including a plurality of hinge joint assemblies and struts.

FIG. 3 is an extended view of FIG. 2 in that hinge joint assemblies are also illustrated at points $B_t$, $C_t$, and $D_t$. As indicated in FIG. 3, these hinge joint assemblies are similar to the hinge joint assembly 31 located at vertex A and illustrated in FIG. 2. In essence, the arms of these hinge joint assemblies are hinged to the other side of the struts connected to the hinge assembly at vertex A. Moreover, the hinge joint assemblies at points $B_t$, $C_t$, and $D_t$ have two additional arms that extend outwardly in equal directions in the same manner as the hinge joint assembly at vertex A. The additional two arms are also hinged to struts. It will be appreciated from this description that an essentially infinite space-frame structure can be formed in this manner. When extended to the expanded position, the space-frame will cover any desired area, only limited by practical considerations. When collapsed, this relatively large volume will be reduced by a factor of up to 80:1.

It should be noted that the actual size of the hinge joint assemblies and struts illustrated in the figures is not intended to be literally interpreted; the proportions represented were chosen to facilitate the scaling of components in the figure. In practice, the hinge pin positions at the ends of the arms, where the arms join the struts, would be located much closer to the center of the hinge joint assemblies. This is done, of course, to avoid excessive reductions in the volume expansion ratio of the resultant space-frame.

It can be seen from the foregoing description that the three-dimensional space-frame configuration of the invention basically comprises a plurality of hinge joint assemblies having arms that extend outwardly in predetermined directions. The outer ends of the arms include or form a portion of a hinge. The invention also comprises a plurality of struts having outer ends that form the other portions of the hinged joint. When the struts are connected to the hinge joint assemblies in a suitable manner, an essentially infinite three-dimensional space-frame structure is formed. As previously indicated, the structure can be locked in place in the collapsed and expanded states, as desired. Moreover, various types of mechanical systems can be utilized to automatically erect the space-frame assembly. In general, every portion of the space-frame assembly is locally rotated when erected (or collapsed), and as it rotates it expands outwardly until it reaches its final expanded condition (or collapses inwardly until it is fully collapsed). However, it should be emphasized that no net rotation of the overall space-frame occurs; there is no net angular momentum associated with the expansion or collapse of any example of such a space-frame.

FIGS. 6, 7 and 8 illustrate one embodiment of a two-dimensional space-frame formed in accordance with the invention. In general, the space-frame illustrated in these figures, when expanded, is basically a square two-dimensional lattice in the plane of expansion. More specifically, FIG. 6 illustrates a plurality of hinge joint assemblies 61 and a plurality of struts 63. The hinge joint assemblies have centers that are located at the vertices of a square two-dimensional lattice. The hinge joint assemblies have arms that extend outwardly in the four orthogonal directions defined by the lattice. At the end of each hinge joint assembly is one portion of a hinge. The hinge joint assemblies are interconnected by the struts 63 which have the other portion of the hinges formed in their outer ends. The struts can be formed in the manner illustrated in FIG. 5. Moreover, the hinge portions of the arms of the hinge joint assemblies 61 can be formed as generally illustrated in FIG. 4, except that they are not three-dimensional in nature. Hence, these assemblies will not be further described here.

FIG. 6 is a fully expanded plan view of a space-frame formed of hinge joint assemblies 61 and struts 63. Opposite corners of each square of the square two-dimensional lattice are designated U and D, respectively. When collapsing the space-frame illustrated in FIG. 6, the U designated hinge joint assemblies are raised and the D designated hinge joint assemblies are dropped in a checkerboard fashion. When this occurs, the opposite vertices move toward one another when viewed in the plane of FIG. 6, whereby collapse of the space-frame ocurs. FIG. 7 is a plan view from the same plane as FIG. 6 illustrating the collapsed configuration. Because the struts are vertical, they cannot be viewed in FIG. 7. FIG. 8 is a side view of a portion of a collapsed space-frame of the type illustrated in FIG. 7. As can be seen from FIG. 7, the up and down checkerboard movement causes the struts to rotate with respect to the hinge joint assemblies connected to their ends in a circular manner. It has been found that an expandable space-frame of the type illustrated in FIGS. 6-8 has a ratio of expanded area to collapsed area of 400:1 when practical size elements are utilized. It should be noted, obviously, that such elements will not have the exact configuration illustrated in the drawings. That is, the drawings are not to scale because to achieve the maximum practical ratio set forth above requires that the struts be longer than shown here, with respect to the length of the arms of the hinge joint assemblies.

FIGS. 9 and 10 illustrate an alternative embodiment of the two-dimensional space-frame formed in accordance with the invention. The expanded and contracted plan views of the space-frame, illustrated in FIGS. 9 and 10, respectively, are those of a regular hexagonal graph. More specifically, the space-frame illustrated in FIGS. 9 and 10 comprises a plurality of hinge joint assemblies 71 having center points located at the corner points of a regular hexagon plane graph. Each of the hinge joint assemblies include three arms that extend outwardly along the hexagonal graph lines. The outer ends of the arms form a portion of a hinge of the type previously described. Also illustrated in FIG. 9 is a plurality of struts 73 that have the other portion of the hinge, as previously described, and interconnect the arms of the hinge joint assemblies. The struts 77 are not viewable in FIG. 10 because FIG. 10 is a plan view of the collapsed space-frame wherein the struts are vertical with respect to the plane of view.

When the two-dimensional space-frame is expanded as illustrated in FIG. 10, it generally defines a plane. The plane comprises the hinge joint assemblies each located at a vertex of a regular hexagonal graph. The hinge joint assemblies are connected by struts 73 that lie along the lines defined by the hexagonal graph, between the vertices. To collapse the space-frame, alternate hinge joint assemblies are raised and lowered, i.e., three vertices (U) of each hexagon are raised and three (D) are lowered. In the collapsed state a regular hexagonal graph is also defined when viewed from above, however, this hexagonal graph is of a considerably smaller size than the hexagonal graph illustrated in FIG. 9.

It should be noted that while a maximum practical area collapse ratio of 400:1 has been stated for the embodiment of the invention illustrated in FIGS. 6, 7, and 8, the collapse ratio for that embodiment as well as the collapse ratio for the embodiment of the invention illustrated in FIGS. 9 and 10 can be calculated by a relatively uncomplicated formula. More specifically, the collapse ratio, R, is equal to $(1+d/s)^2$, where $d$ is equal to the length of the strut and $s$ is equal to the distance between the vertices minus the length of the strut.

It will be appreciated from the foregoing description that the plane or two-dimensional space-frame embodiments of the invention illustrated in FIGS. 6-10 operate and are formed of components similar to the space-frame embodiment of the invention illustrated in FIGS. 2-5. More specifically, all of the space-frames formed in accordance with the invention comprise a plurality of hinge joint assemblies having arms that extend outwardly in predetermined directions. The outer ends of the arms form a portion of a hinge joint. In addition, a plurality of struts are included that connect the outer ends of the arms in a predetermined array. In this manner, an essentially infinite periodic space-frame that either includes a volume or a plane is provided by the invention.

It will be appreciated by those skilled in the art and others that only preferred embodiments of the invention have been illustrated and described. However, other embodiments fall within the scope of the invention. For example, a larger number of arms can extend outwardly from the hinge joint assemblies to form a more complex structure. However, in general, these more complex structures have a more limited collapse ratio than those herein described. However, in some environments they will provide greater strength and rigidity and, hence, may be preferred. Further, while uncomplicated pin hinges have been illustrated and described, other types of hinges can be used by the invention. Moreover, wide latitude exists in the choice of the size of the struts and the size and form of the hinge joint assemblies. For example, the struts can be formed of tubular plastic or metal elements. Alternatively, the struts can have U or I-beam cross-sectional configurations. Hence, the invention can be practiced otherwise than as specifically described herein.

What is claimed is:

1. In a space-frame having substantially infinite periodicity and adapted to be expanded from a collapsed condition, the improvement comprising:

A. a plurality of mutually displaceable, uniformly spaced hinge joint assemblies, each of said assemblies being situated at a vertex defined at a point of intersection for three symmetrically related imaginary diagonals extended between the midpoints of a pair of diametrically opposed corner edges of an imaginary cube and characterized by three commonly dimensioned arms extended along said diagonals toward three mutually perpendicular corner edges of said imaginary cube, and three first tubular hinge flanges integral with the distal ends of each of said arms and concentrically related with said mutually perpendicular corner edges of said imaginary cube;

B. a plurality of commonly dimensioned struts extended between adjacent hinge joint assemblies of said plurality, each of said struts being characterized by a pair of second tubular hinge flanges, said second tubular hinge flanges being integral with the opposite ends of said strut and coaxially mated with a pair of first tubular hinge flanges; and C. a plurality of hinge pins, each being extended through a mated first and a second tubular hinge flange for coupling mated flanges into a plurality of hinge joints, each having an axis of rotation coincident with one corner edge of said imaginary cube for accommodating substantially 90° of pivotal displacement of the strut and about said axis whereby a relative repositioning of said hinge assemblies is facilitated.

* * * * *